(12) United States Patent
Nitz

(10) Patent No.: US 9,832,935 B1
(45) Date of Patent: Dec. 5, 2017

(54) POWERED DEBRIS COLLECTOR

(71) Applicant: Ron Nitz, Port Byron, IL (US)

(72) Inventor: Ron Nitz, Port Byron, IL (US)

( * ) Notice: Subject to any disclaimer, the term of this patent is extended or adjusted under 35 U.S.C. 154(b) by 386 days.

(21) Appl. No.: 13/920,896

(22) Filed: Jun. 18, 2013

Related U.S. Application Data

(60) Provisional application No. 61/661,380, filed on Jun. 19, 2012.

(51) Int. Cl.
*A01G 1/12* (2006.01)
*E01H 1/04* (2006.01)

(52) U.S. Cl.
CPC .............. *A01G 1/125* (2013.01); *E01H 1/045* (2013.01); *E01H 1/047* (2013.01)

(58) Field of Classification Search
CPC .......... E01H 1/045; E01H 1/047; A01G 1/125
USPC ............... 15/83–86, 79.1, 79.2; 56/130, 344, 56/362–364
See application file for complete search history.

(56) References Cited

U.S. PATENT DOCUMENTS

| 552,887 A | * | 1/1896 | Branth ........................... 15/79.1 |
| RE20,453 E | * | 7/1937 | Furstnow ................ E01H 1/045 15/83 |
| 2,092,230 A | * | 9/1937 | Thomas ......................... 15/79.1 |
| 2,525,090 A | * | 10/1950 | Bott ............................... 56/16.6 |
| 2,546,620 A | * | 3/1951 | Van Ness ................... 56/400.02 |
| 3,084,363 A | * | 4/1963 | Vetne .............................. 15/79.1 |
| 3,134,118 A | * | 5/1964 | Choninard ..................... 15/79.1 |
| 3,493,987 A | * | 2/1970 | Longnecker ............ E01H 1/047 15/83 |
| 4,221,018 A | * | 9/1980 | Hajdu ............................. 15/347 |
| 4,593,426 A |   | 6/1986 | Chrisley |
| 5,133,413 A |   | 7/1992 | Baxter |
| 5,416,949 A | * | 5/1995 | Jute ................................ 15/339 |
| 6,070,290 A | * | 6/2000 | Schwarze .............. A01B 45/00 15/340.1 |
| 6,640,532 B1 | * | 11/2003 | Bogart ................... A01G 1/125 15/149 |
| 2004/0060139 A1 | * | 4/2004 | Peters ............................... 15/83 |

FOREIGN PATENT DOCUMENTS

JP 2002363937 A * 12/2002

* cited by examiner

*Primary Examiner* — Andrew A Horton
(74) *Attorney, Agent, or Firm* — Hamilton IP Law, PC; Jay R. Hamilton; Charles Damschen

(57) ABSTRACT

A PTO driven yard clean up tool is for attachment to a tractor is disclosed and claimed. The PTO system drives a rake attachment that runs in a counter-clockwise direction to the direction of travel to throw material into a basket; the material can be dumped out of the basket when it gets full by tilting the basket.

12 Claims, 15 Drawing Sheets

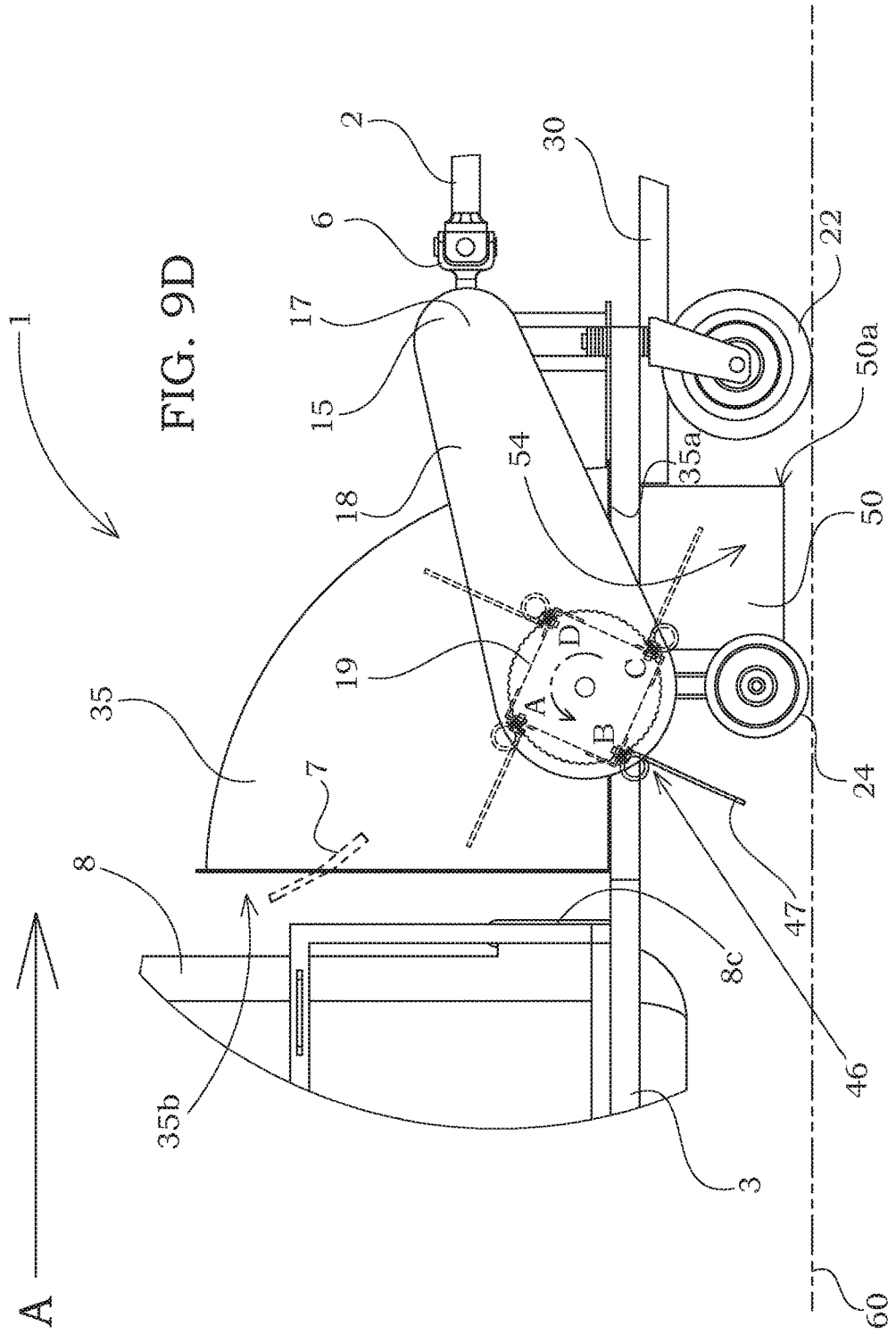

POWERED DEBRIS COLLECTOR

CROSS REFERENCE TO RELATED APPLICATIONS

The present application claims priority from provisional U.S. Pat. App. No. 61/661,380 filed on Jun. 19, 2012, which is incorporated by reference herein in its entirety.

FIELD OF THE INVENTION

The present invention relates to a powered device which may be pulled for engaging and collecting irregularly positioned debris, such as that found on lawns and in yards and including at least small stones, leaves, twigs, branches, walnuts and husks, for use with a tractor, gator or lawn mower.

STATEMENT REGARDING FEDERALLY SPONSORED RESEARCH OR DEVELOPMENT

No federal funds were used to develop or create the invention disclosed and described in the patent application.

AUTHORIZATION PURSUANT TO 37 C.F.R. §1.171 (D)(C)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DETAILED DESCRIPTION—BRIEF DESCRIPTION OF DRAWINGS

Figure 1:
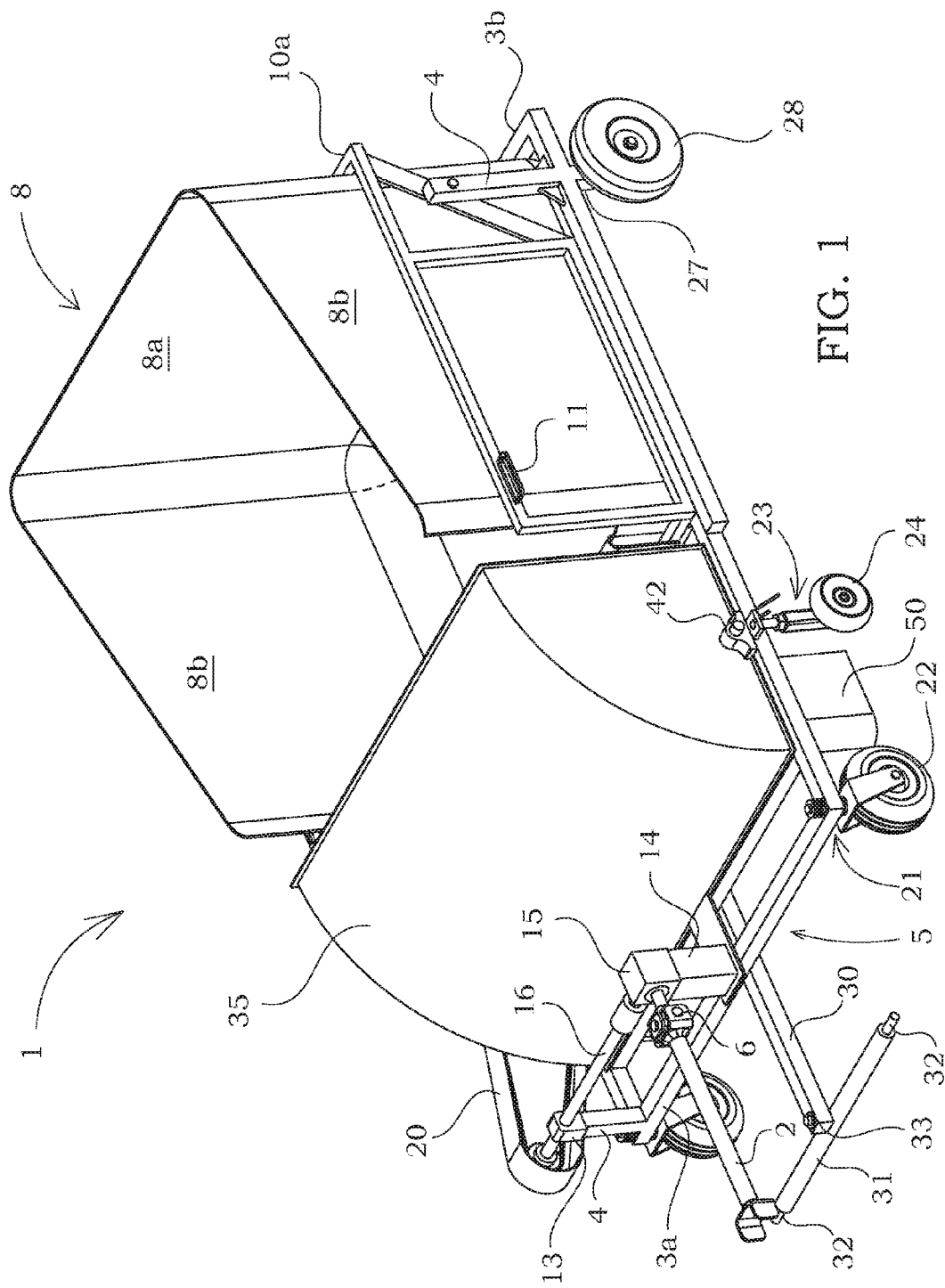

FIG. 1 provides a front perspective exterior view of one embodiment of the powered debris collector for pulled attachment.

Figure 2A:
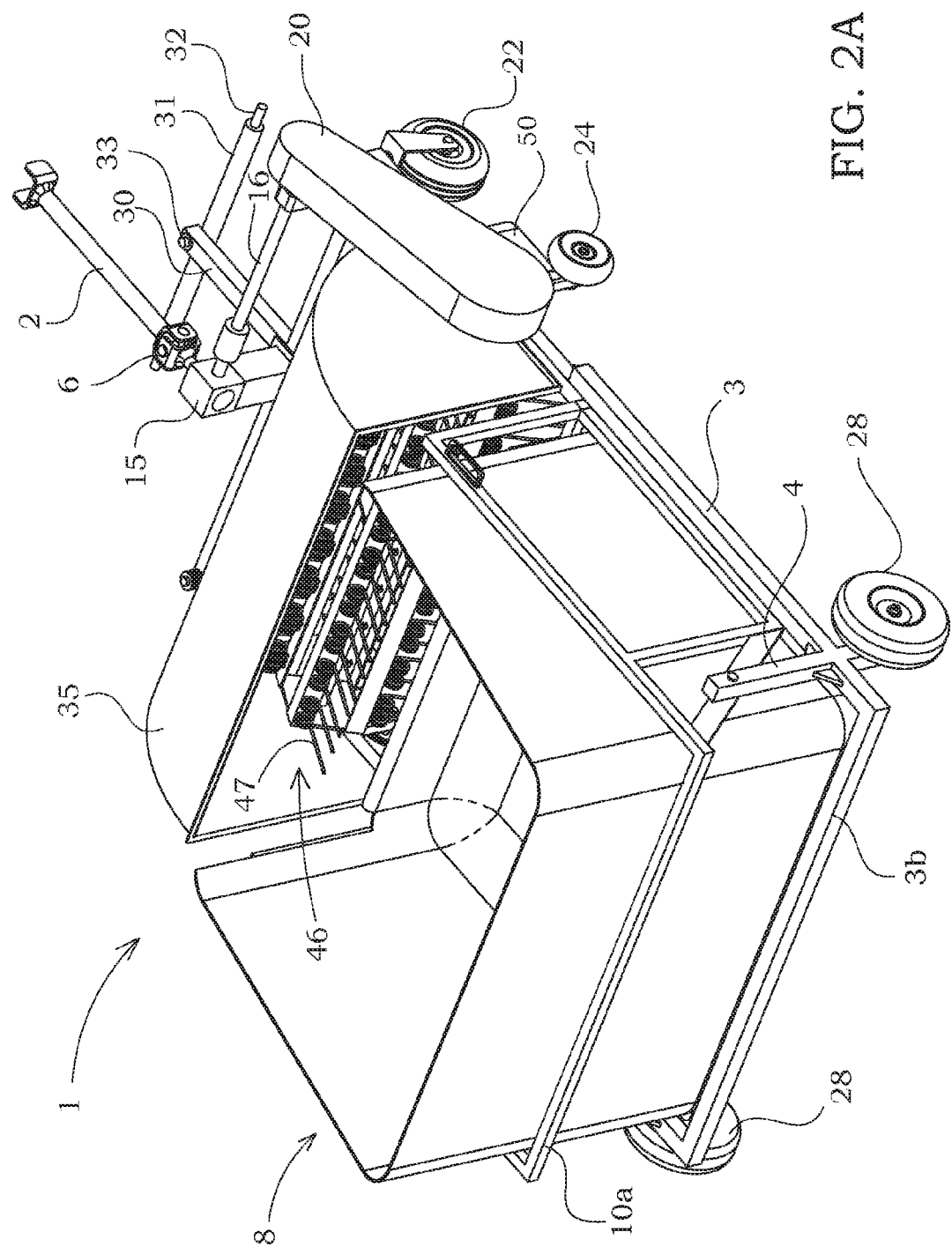
Figure 2B:
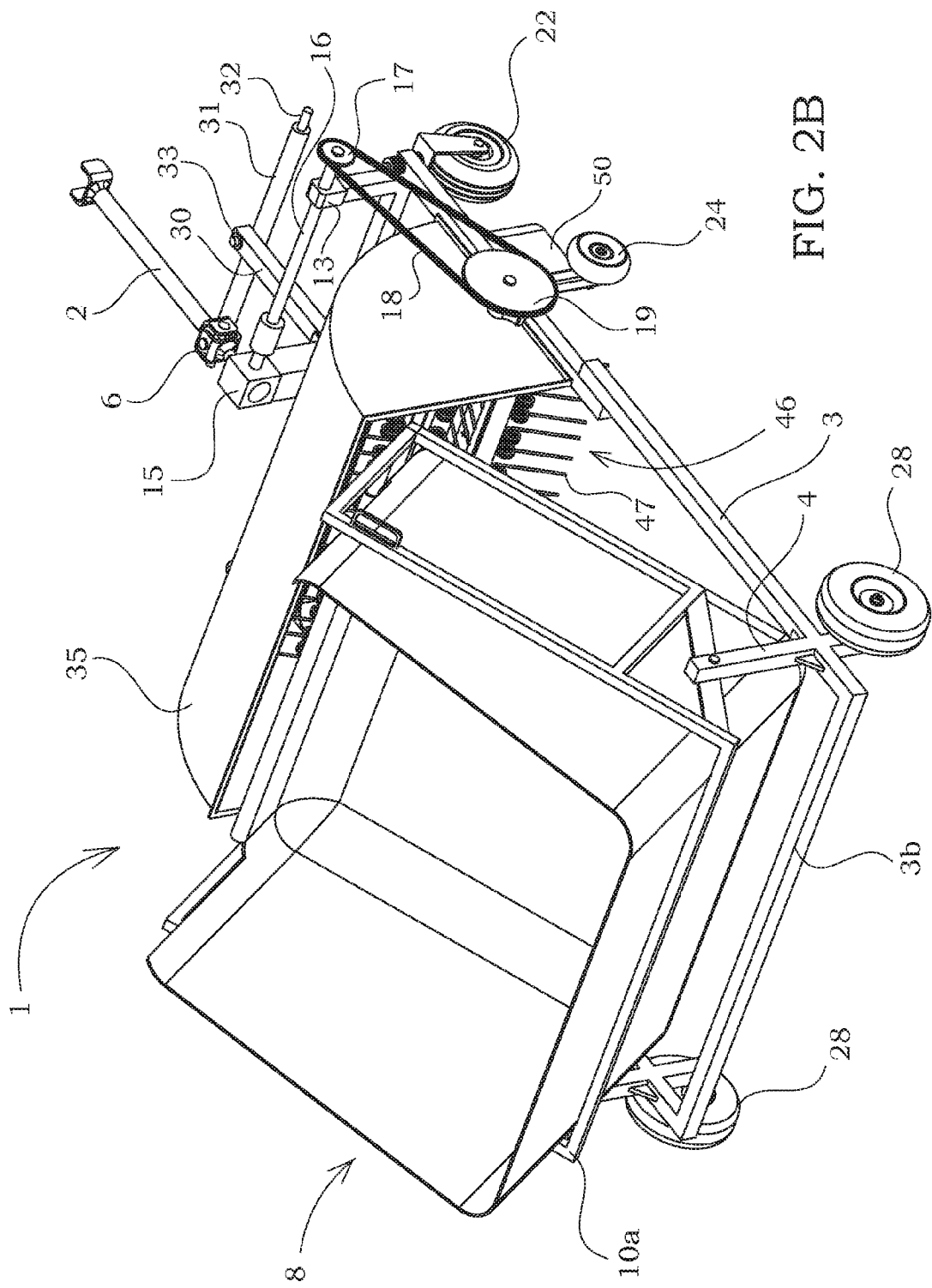
Figure 2C:
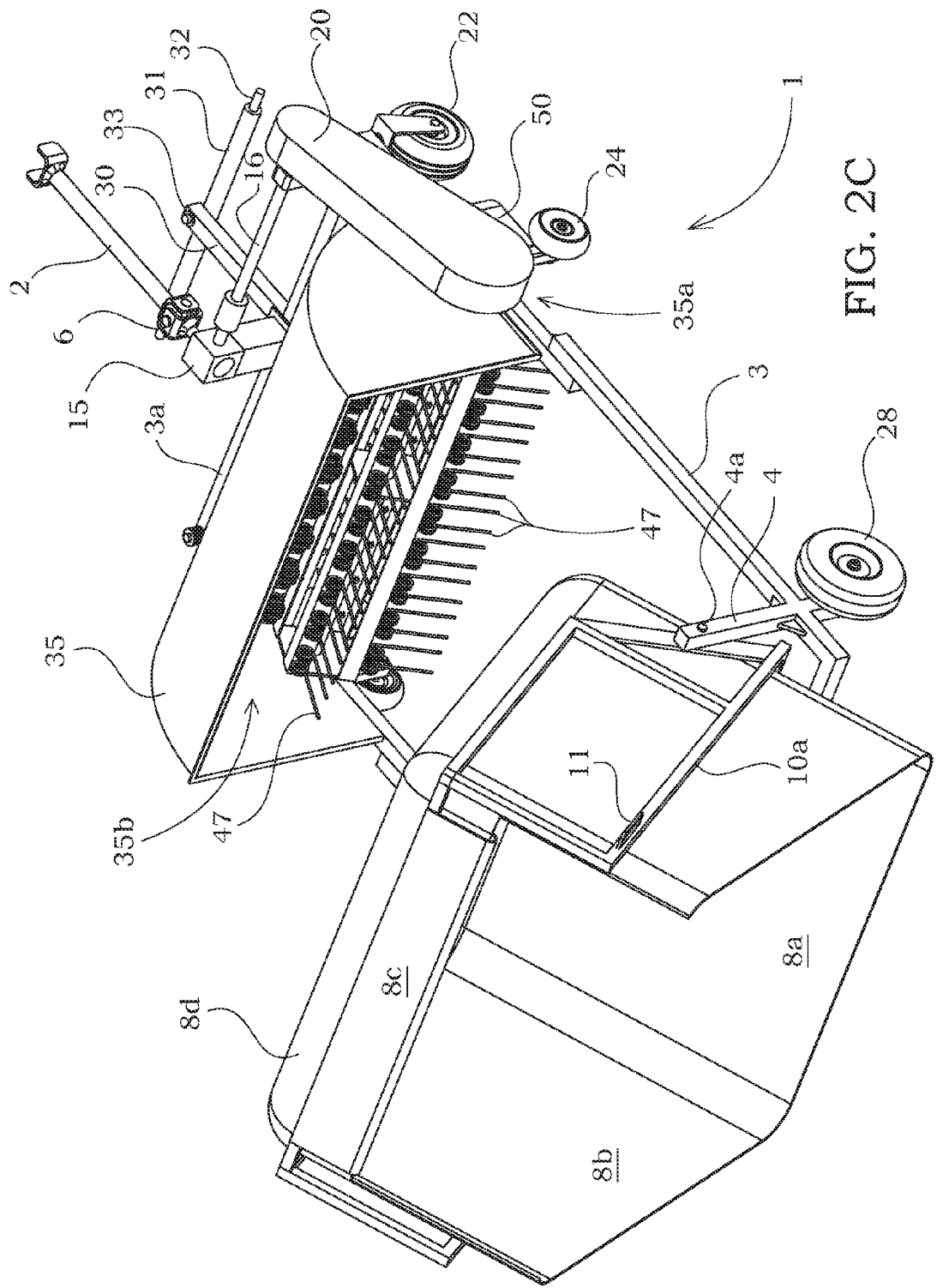
Figure 2D:
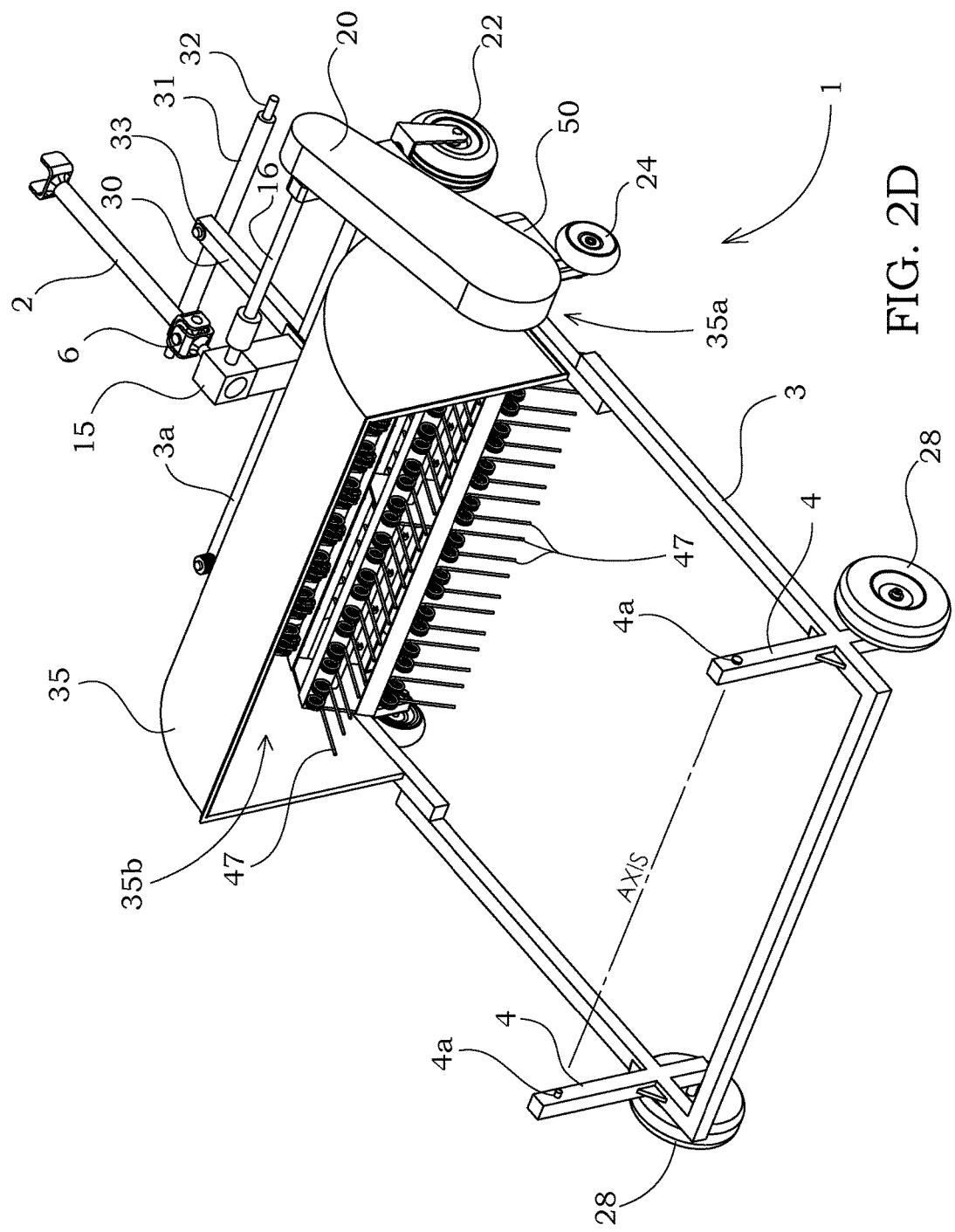

FIGS. 2A, 2B and 2C provide a top rear perspective view of the embodiment of the debris collector of FIG. 1 with the basket in the collection, tilting and dumping positions, respectively. FIG. 2D is a top rear perspective view of the embodiment of the debris collection of FIG. 1 with the basket removed to highlight the pivot axis of the basket.

Figure 3:
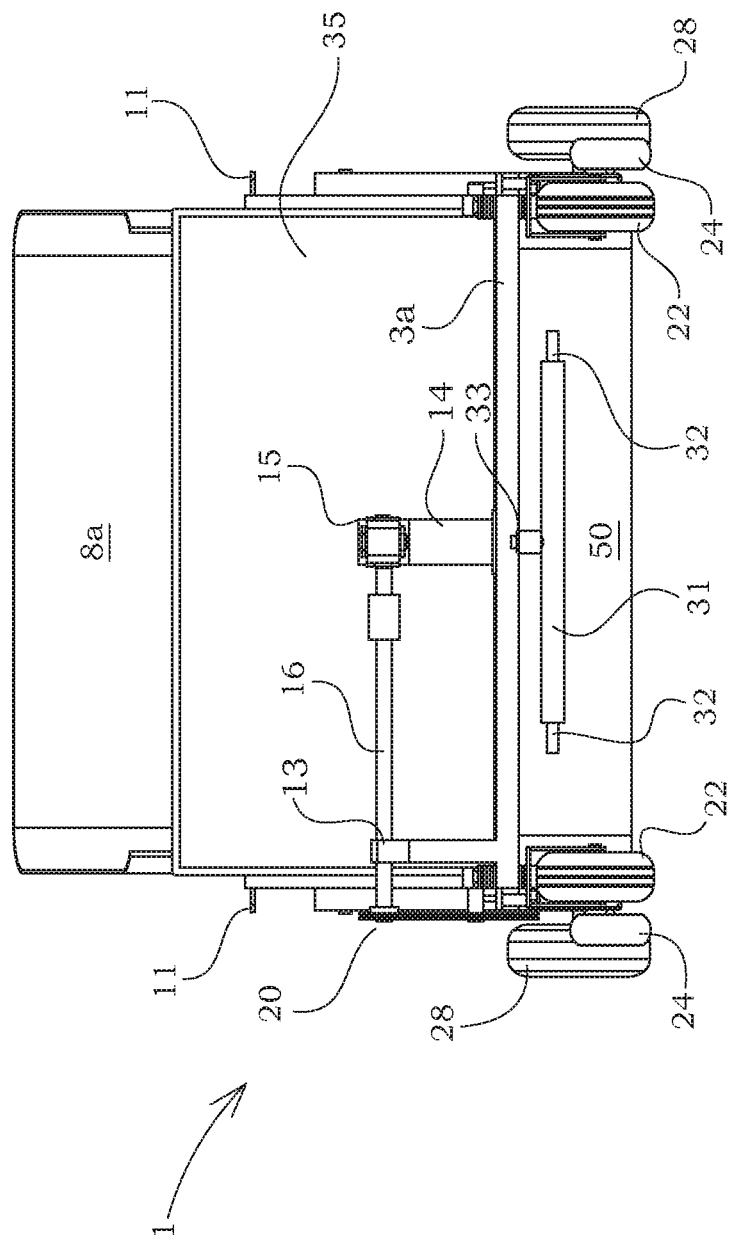

FIG. 3 provides a front view of the embodiment of the debris collector of FIG. 1.

Figure 4:
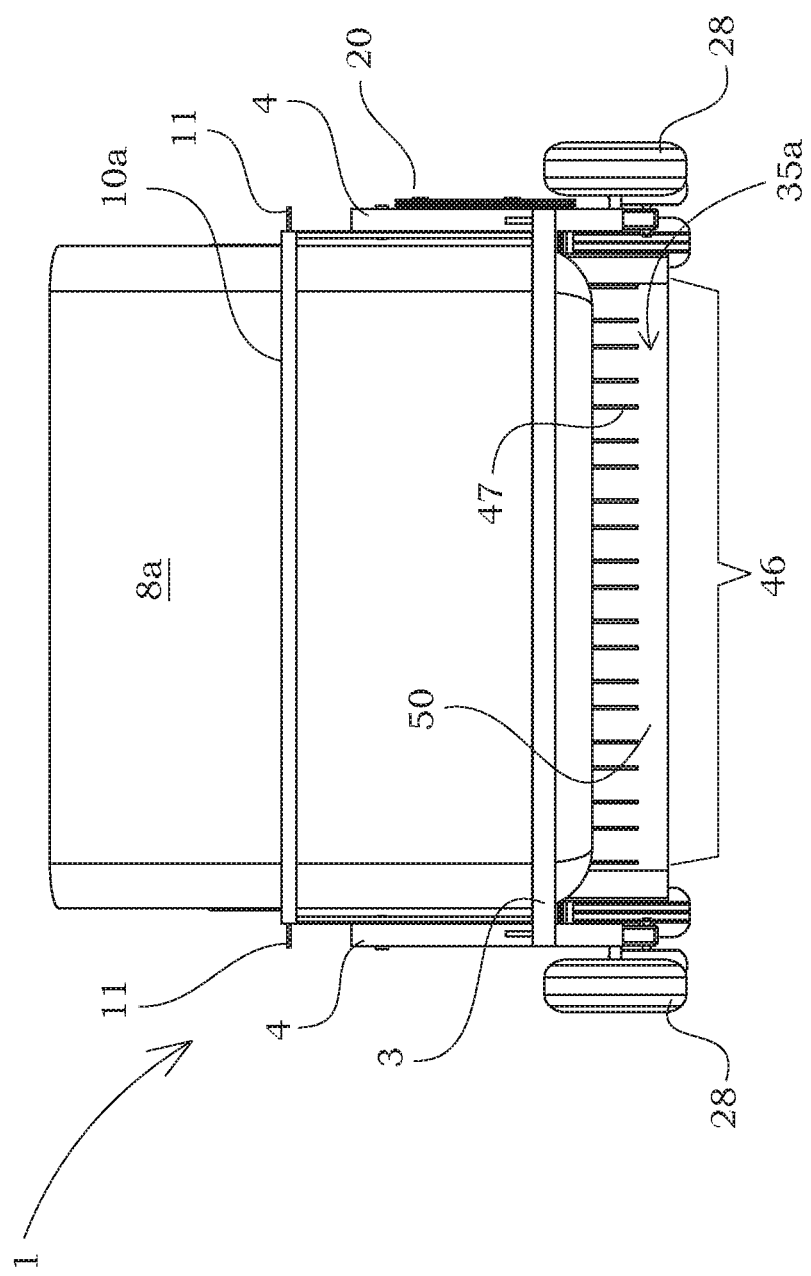

FIG. 4 provides a rear view of the embodiment of the debris collector of FIG. 1.

Figure 5:
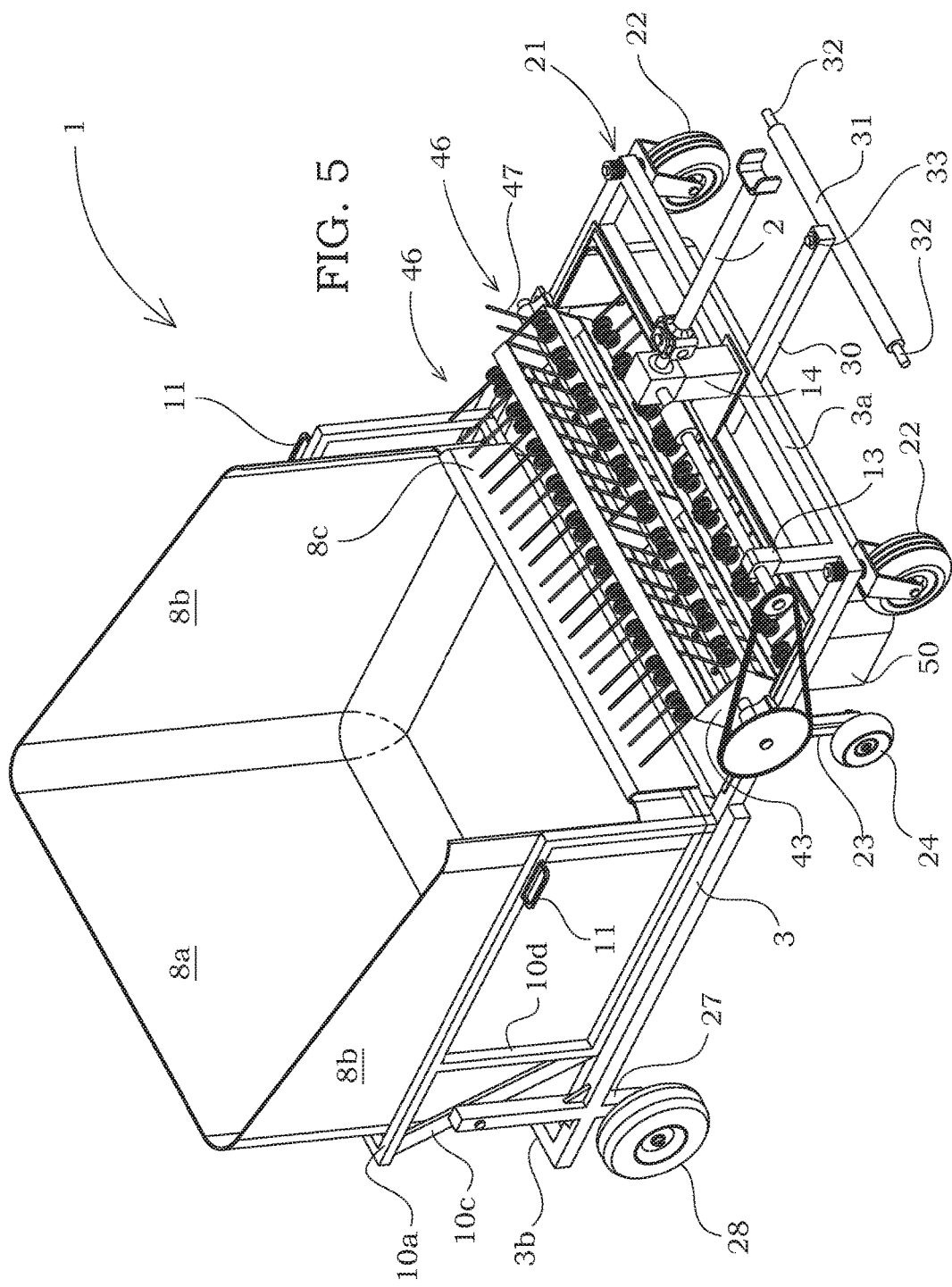

FIG. 5 provides a detailed front interior view of the debris collector of FIG. 1 with the housing removed to reveal the interior components of the rake drum.

Figure 6:
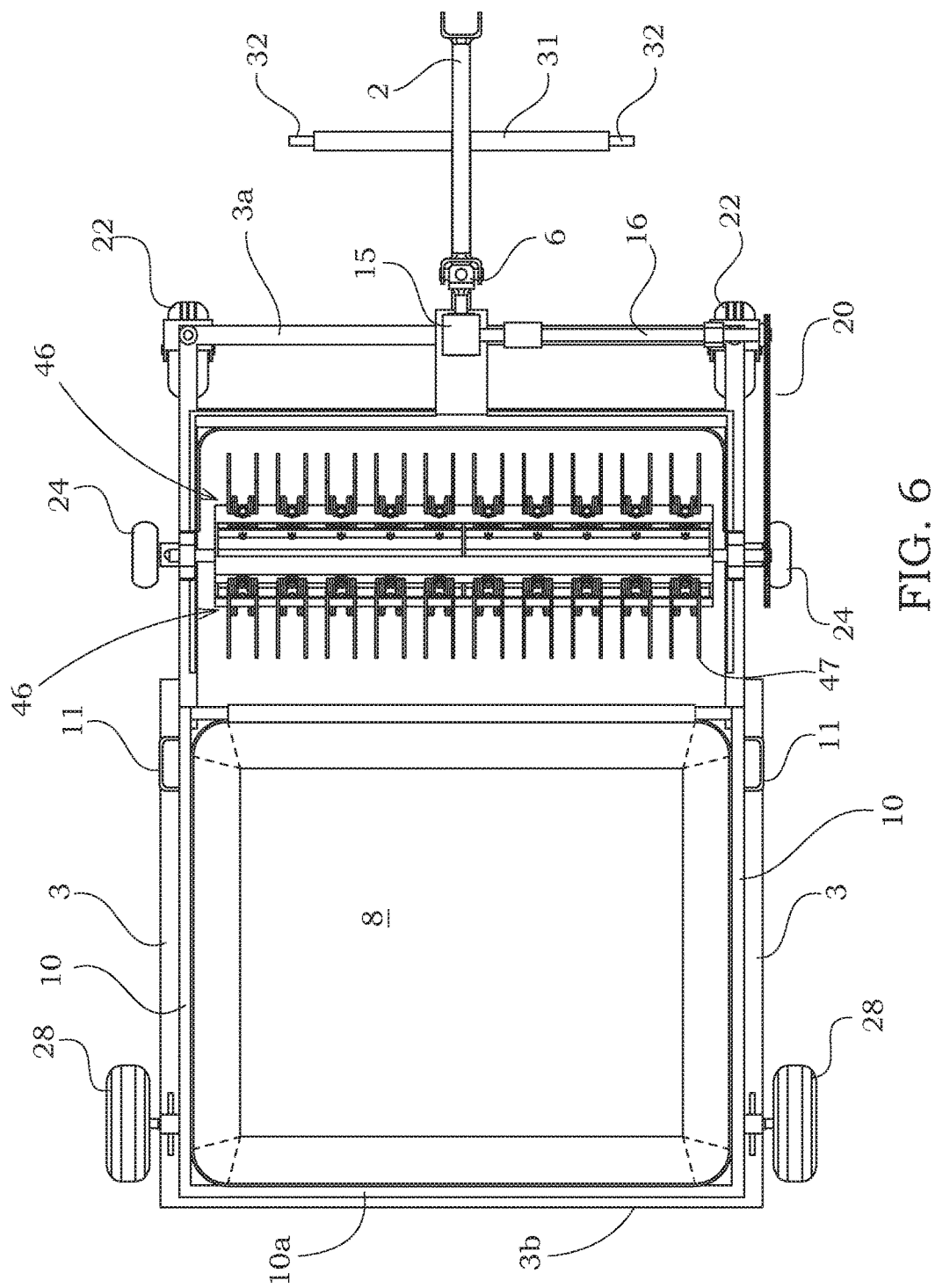

FIG. 6 provides a detailed top interior view of the debris collector of FIG. 1 with the housing removed to reveal the interior components of the rake drum.

Figure 7:
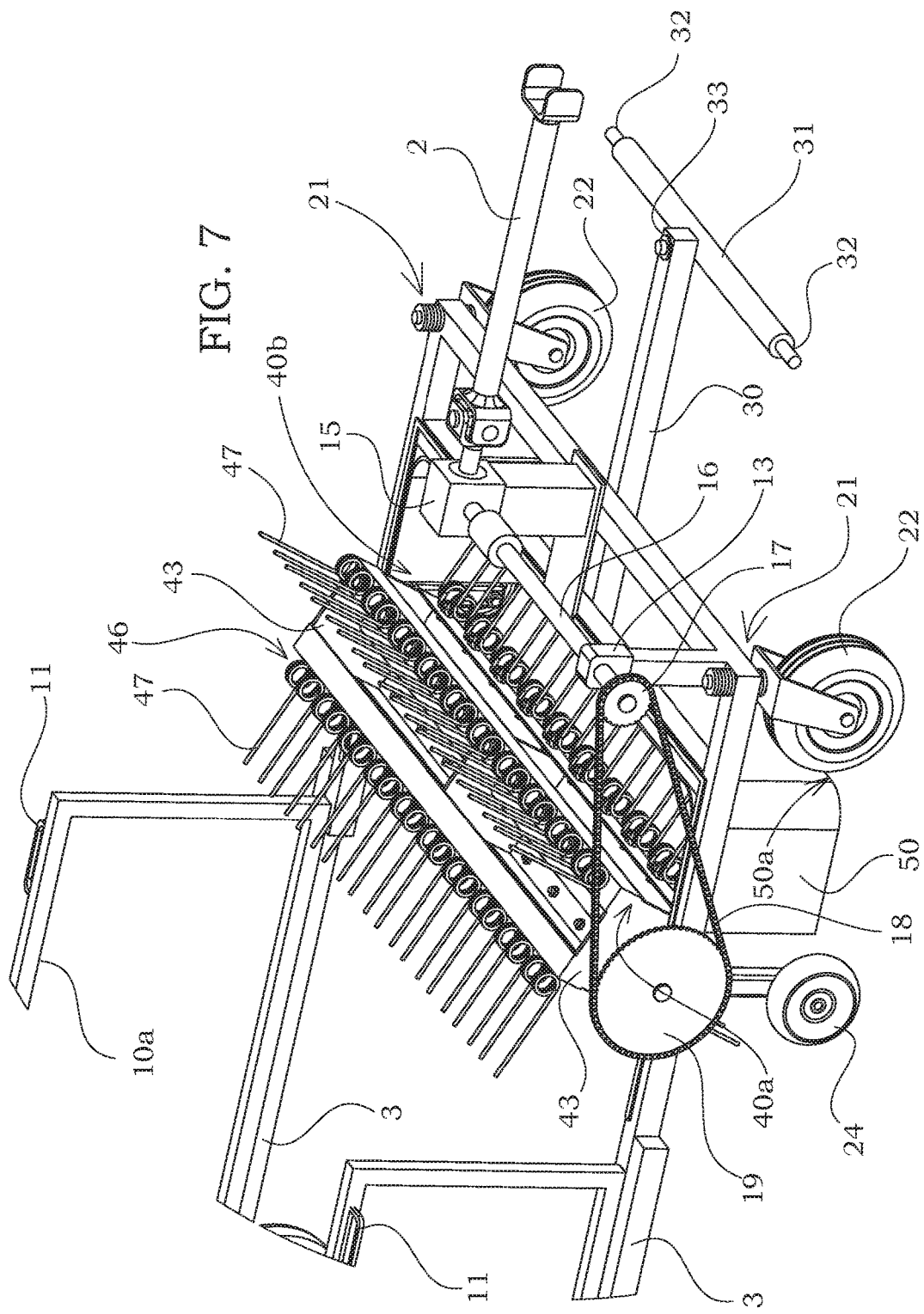

FIG. 7 provides a detailed perspective view of the interior components of the rake drum of the debris collector of FIG. 1.

Figure 8A:
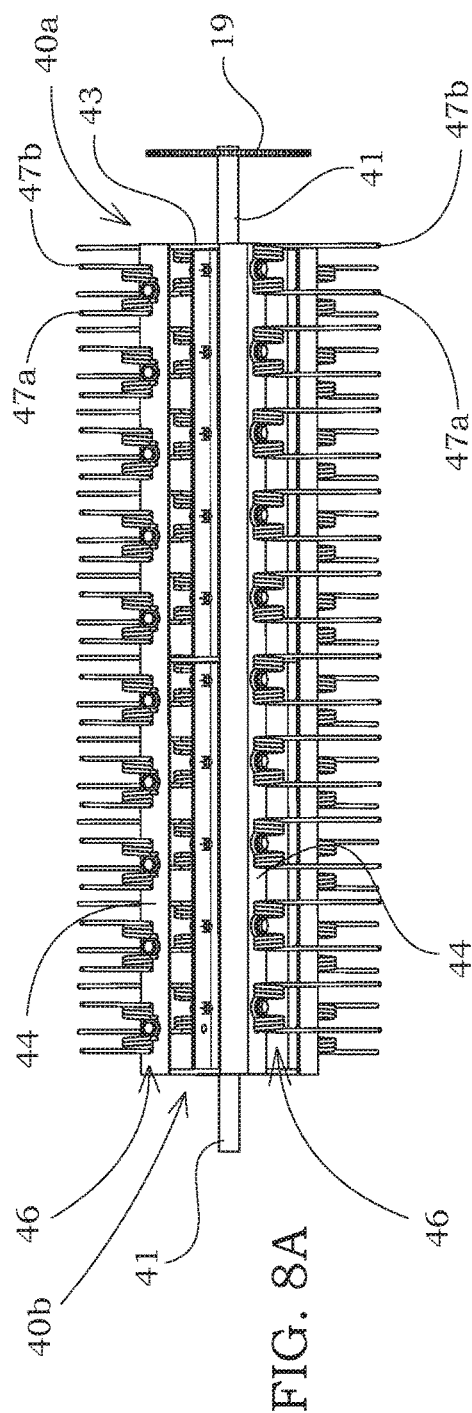

FIG. 8A provides a top perspective view of the rake drum with the complimentary tines of the various rows of the debris collector of FIG. 1 offset.

Figure 8B:
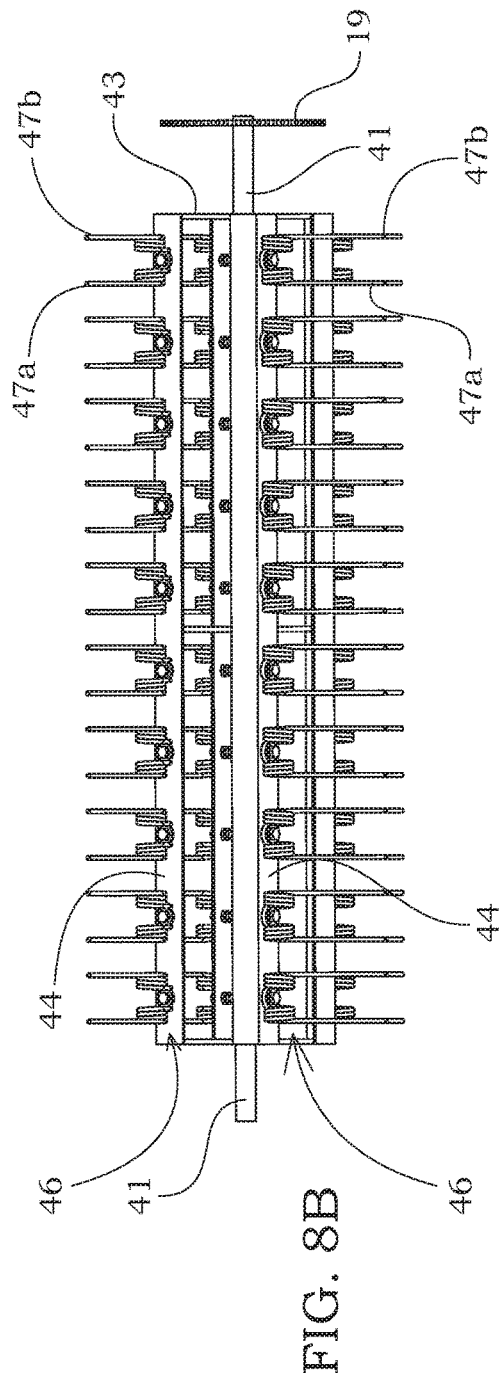

FIG. 8B provides a top perspective view of the rake drum with the complimentary tines of the various rows aligned of the debris collector of FIG. 1.

FIGS. 9A, 9B, 9C and 9D provide a side view of the embodiment of the debris collector of FIG. 1 with the rake drum making a full rotation during collection operations.

Before the various embodiments of the present invention are explained in detail, it is to be understood that the invention is not limited in its application to the details of construction and the arrangements of components and elements set forth in the following description or illustrated in the drawings. The invention is capable of other embodiments and of being practiced or of being carried out in various ways not explicitly disclosed herein without departing from the scope and spirit of the present invention.

DETAILED DESCRIPTION - LISTING OF ELEMENTS

| Element Description | Element Number |
|---|---|
| Debris Collector | 1 |
| Power Take-Off (PTO) Shaft | 2 |
| Main Frame | 3 |
| Vertical support | 4 |
| Horizontal support | 5 |
| Knuckle | 6 |
| Debris | 7 |
| Basket | 8 |
| Basket support frame | 10 |
| Basket handle | 11 |
| Cross member | 12 |
| Carriage Bearing (drive) | 13 |
| Bracket | 14 |
| Gear Box | 15 |
| Input (drive) shaft | 16 |
| First sprocket (driver) | 17 |
| Chain | 18 |
| Second sprocket (driven) | 19 |
| Chain guard | 20 |
| Front wheel assembly | 21 |
| Front wheel | 22 |
| Gauge wheel assembly | 23 |
| Gauge wheel | 24 |
| Rear wheel assembly | 27 |
| Rear wheel | 28 |
| | 29 |
| Hitch | 30 |
| Drawbar | 31 |
| Three-point hitch end | 32 |
| Pivot | 33 |
| Housing | 35 |
| Support | 36 |
| Rake attachment | 40 |
| Rake drum shaft | 41 |
| Carriage bearing(s) | 42 |
| Rake drum | 43 |
| Cross member | 44 |
| Row of Tines | 46 |
| Tines | 47 |
| | 49 |
| Flexible engagement member | 50 |
| Engagement area | 54 |
| Dimension - frame to terrain | 56 |
| Dimension - tines to terrain | 57 |
| Dimension - flexible engagement member to terrain | 58 |
| Terrain | 60 |

DETAILED DESCRIPTION OF INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appending claims. Various inventive features are described below that can each be used independently of one another or in combination with other features. Broadly, the embodiments of the present invention provide a method and apparatus that allows for yard waste and debris pick-up and collection.

The debris collector depicted in FIGS. 1-9 herein is configured to be driven by a power take off (PTO) system as commonly found and used on tractors or lawn mowers and utility vehicles such as an "ATV" for off-road use. In no way does this limit the scope of the present invention as one of ordinary skill will appreciate that modification for use with a pick-up truck or integration of a power plant with the components described will be obvious to one of ordinary skill in the art in view of the present disclosure. For simplicity herein, applicant will simply use the term "garden tractor" through-out. As illustrated in FIGS. 1-3, 5-7 and 9, the hitch 30 and three point mounting system 32, as attached to the main frame 3 of the debris collector 1, may be attached to and between the two lift arms of the three-point hitch of a garden tractor having a three-point hitch system (not shown). Pivot 33 between hitch 30 and drawbar 31 allows shorter turning between the tractor and debris collector 1. (Not shown)

As shown through-out the figures, to drive the components of the debris collector as shown, a first shaft 2 (PTO shaft) is connected to a gear box 15 which is connected to and turns (drives) an input (drive) shaft 16 upon the end of which is first sprocket 17 which is drive or driver sprocket 17. (See FIG. 1) FIG. 5 provides a view of the debris collector with chain guard 20 removed, illustrating the drive system. As shown, a chain 18 is connected to and between the first sprocket 17 and second sprocket 19 (driven) which is connected to the rake drum shaft 41 of rake attachment 40. As depicted in the accompanying figures, the first sprocket 17 is a fourteen (14) tooth sprocket to drive a thirty-six (36) tooth sprocket and running on a drive shaft having a diameter of one inch (1.0"). As one of ordinary will appreciate, the sizes and dimensions provided are for demonstrative purposes only and in no way limit the breadth of the disclosure. Additionally, other elements not shown, including chain tensioners and additional idler sprockets, may be included within the chain drive system as needed to maintain proper chain operating tension.

The rake drum shaft 41 of rake attachment 40 as illustrated rotates in a counter-clockwise direction (based on right hand nomenclature) to collect and throw debris material into the basket. (See FIGS. 9A-9D herein for further discussion)

In this way the rake attachment works to "scoop up" the debris from the terrain for collection in basket 8 and removal. As shown in FIGS. 2A-2C, material collected in the dump basket 8 may be dumped out of the basket 8 when it gets full, by inclining the basket 8 up and over its axis of rotation via joint 4a, embodied by a pin affixed between the rear of the basket and an upper portion of the vertical supports 4 attached to the main frame 3. One of ordinary skill will appreciate other embodiments of the present invention are possible without departure from the scope applicant's claims including embodiments having no basket 8 for collection. As illustrated in FIGS. 2A-2C, the basket 8 is configured of an upper portion 8a for debris collection and a lower base portion 8d cooperatively engaged with the rear portion of the main frame 3. The basket 8 has pivot axis which is defined by the rear portion of the horizontal frame. When the basket 8 is in position for collection, the pivot axis is above the lower base portion 8d of the basket. When the basket 8 is pivoted to the position for dumping, the pivot axis is below the lower base portion 8d of the basket. See FIG. 2D with the basket 8 removed to highlight the pivot axis.

The rake attachment 40, of the illustrative embodiment shown herein, as detailed in FIGS. 5-7, is forty inches (40") wide. The rake attachment 40 is comprised of the rake drum 43, the drum shaft 41, and cross member 44. As shown, the rake drum 43 and cross member 44 are made from steel angle iron (1½"×1½"×⅛") attached around the periphery of the drum shaft 41 to another steel plate (having a dimension of 6"×6"×4"). Ten pairs of rake tines 47, eight inches (8") in length, are attached to each of the four plates segregating the tines 47 of the rake attachment 40 into four rows of tines 46. One of ordinary skill will appreciate that the rake attachment 40 could also be constructed in other ways including using multiple shafts, with tines 47 attached therein, positioned around main drum shaft 41, with more or less rows of tines 46. As shown in FIGS. 8A and 8B, the tines 47 between adjacent rows of tines 46 may be aligned or offset. In FIG. 8A, note that complimentary positioned tines 47a and 47b on adjacent rows of tines 46, are aligned. In FIG. 8B, the complimentary positioned tines 47a and 47b on adjacent rows of tines 46, are offset, with the expectation that reducing the ultimate spacing between adjacently positioned tines 47, improves performance for finer or smaller debris. As disclosed the individual rake tines 47 are fixed in relation to the rake drum 43, i.e. the rake tines 47 rotate with turning of the rake drum shaft 41 and rake drum 43. The rake tines 47 do not rotate in relation to the rake drum 43.

The rake drum shaft 41 as illustrated is one inch in diameter is and is held to the main frame 3 using a pair of carriage bearings 42. Although not shown in detail, the carriage bearings 42 are affixed to the main frame 3 with three eighths inch by three inch (⅜"×3") bolts. One of ordinary skill will appreciate that other methods of fabrication and means of construction are contemplated and further discussion is unnecessary.

As shown throughout but best exemplified by FIG. 5 having housing 35 removed, the main frame 3 of the debris collector as shown may be constructed in two pieces, each made from one and a half inch (1½") square tubing. (See also FIGS. 1-4, 7) The front piece of the frame 3a is thirty-three and a half inches by forty-six inches (33½"×46") and the back piece is forty-nine by forty-nine inches by forty-four inches in dimension (49"×49"×44"). The back piece of the frame 3b is welded to the outside of the front piece 3a to provide support for the basket 8, as called out in FIGS. 1 and 5. As one of ordinary skill will appreciate, the basket 8 is fabricated from plastic but other materials including steel and aluminum may be chosen as well. The front piece of the frame 3a has the wheel assemblies (21, 23) and the hitch 30 mounted to it. The front wheel assembly 21, as shown, is an eight inch (8") solid rubber wheel 22 mounted on a five inch (5") rim. The front wheel assembly 21 allows the wheel 22 to castor and is mounted to the frame 3a with a five-eighths inch (⅝") bolt as a fastener towards the outer corners of the frame 3a. The use of castor wheels 22 with the first wheel assembly 21 reduces the turning radius of the debris collector 1 allowing use in smaller, tighter spaces as is not uncommon with yards. One of ordinary skill in the art will appreciate that non-castor type wheels may be used in place of the castor wheels 22. (Not shown)

As shown, the height of the debris collector 1 is adjustable in relation to the terrain (labeled 56 in FIG. 9A) by adding (to raise the height) washers to the bolt under the frame upon which the front wheel assembly 21 is mounted to the frame 3b. (See FIGS. 1, 2B and FIG. 3 and additional discussion herein) One of ordinary skill will appreciate other methods of mounting or fastening and other types of wheel assemblies are well known in the prior art and are within the scope of the present disclosure making further discussion unnecessary.

The gauge wheels 24 are solidly mounted to the frame 3 by gauge wheel assembly 23 which is a one inch (1") square tubing, that is six and one half inches (6½") long and bolted to the main frame 3 proximate the rake attachment 40 and posterior of the front wheel assembly 21. A five-eight inch (⅝") bolt holds the gauge wheel assembly 23 to the end of the bracket. (See FIGS. 1, 3, 4, and 7) The gauge wheels 24 are standard five inch (5") mower deck wheels but other wheels may work without departure from the scope of the present disclosure including rubber wheels and skids or skis. The gauge wheels 24 act to allow the front portion of the debris collector 1 to follow the contour of the terrain upon which the debris collector operates. (See FIGS. 9A-9D) As shown, the height of the gauge wheels 24 may not be adjusted. However, one of ordinary will appreciate there are a multitude of ways to allow the height of the gauge wheels to be adjusted, including placing the gauge wheel on a threaded member and allowing threaded adjustment in or out to increase or decrease the height of the gauge, as required by the condition of the terrain and the size of the debris. In another embodiment, not shown, the gauge wheel could be adjusted by mounting the gauge wheels on a shaft having apertures therein and changing the position using pins inserted in different apertures along the axis of the shaft. (See additional discussion herein). As one of ordinary skill will appreciate, other methods of constructions and materials may be selected without limiting the breadth of the disclosure.

On the front piece of the frame 3b is the bracket 14 that holds the one inch (1") drive shaft 16 from the gear box 15 which drives sprocket 17. This shaft 16 is held in place by another carriage bearing 13. As shown, the bracket 14 that holds the gear box 15 to the main frame 3 is made from flat stock, welded and shaped in an "H" pattern. (See FIGS. 1 and 7) The hitch 30 is made of one and a half inch (1½") square tubing and is attached to the inside of the main frame 3 with another piece of one and a half inch (1½") square tubing that also anchors the bracket 14 for the gear box 15. (See FIG. 1) The hitch 30 is connected at the other end to a drawbar 31, having three point end connection points 32 for attachment to the three-point lift arms of a tractor (not shown).

Figure 9A:
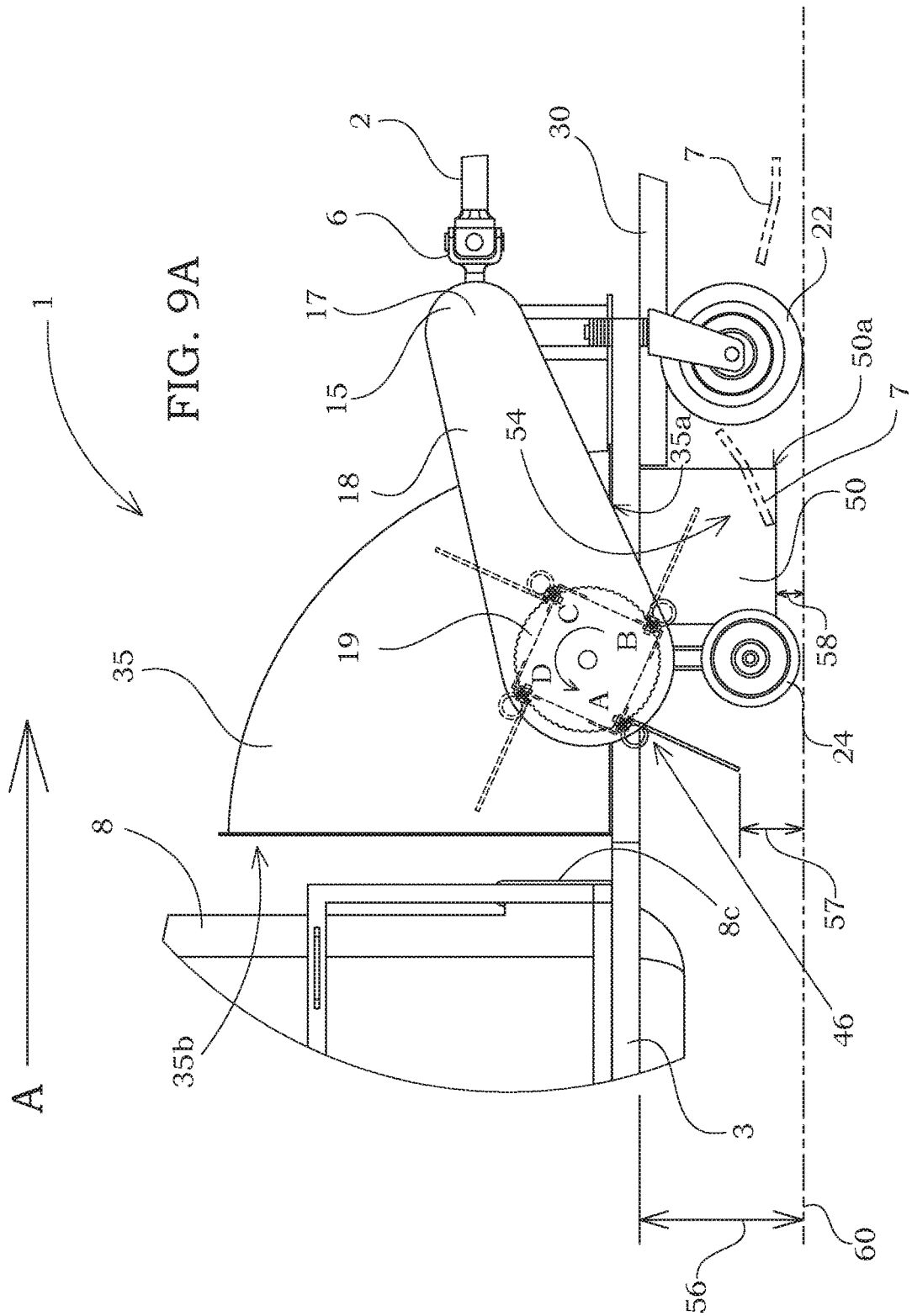
Figure 9B:
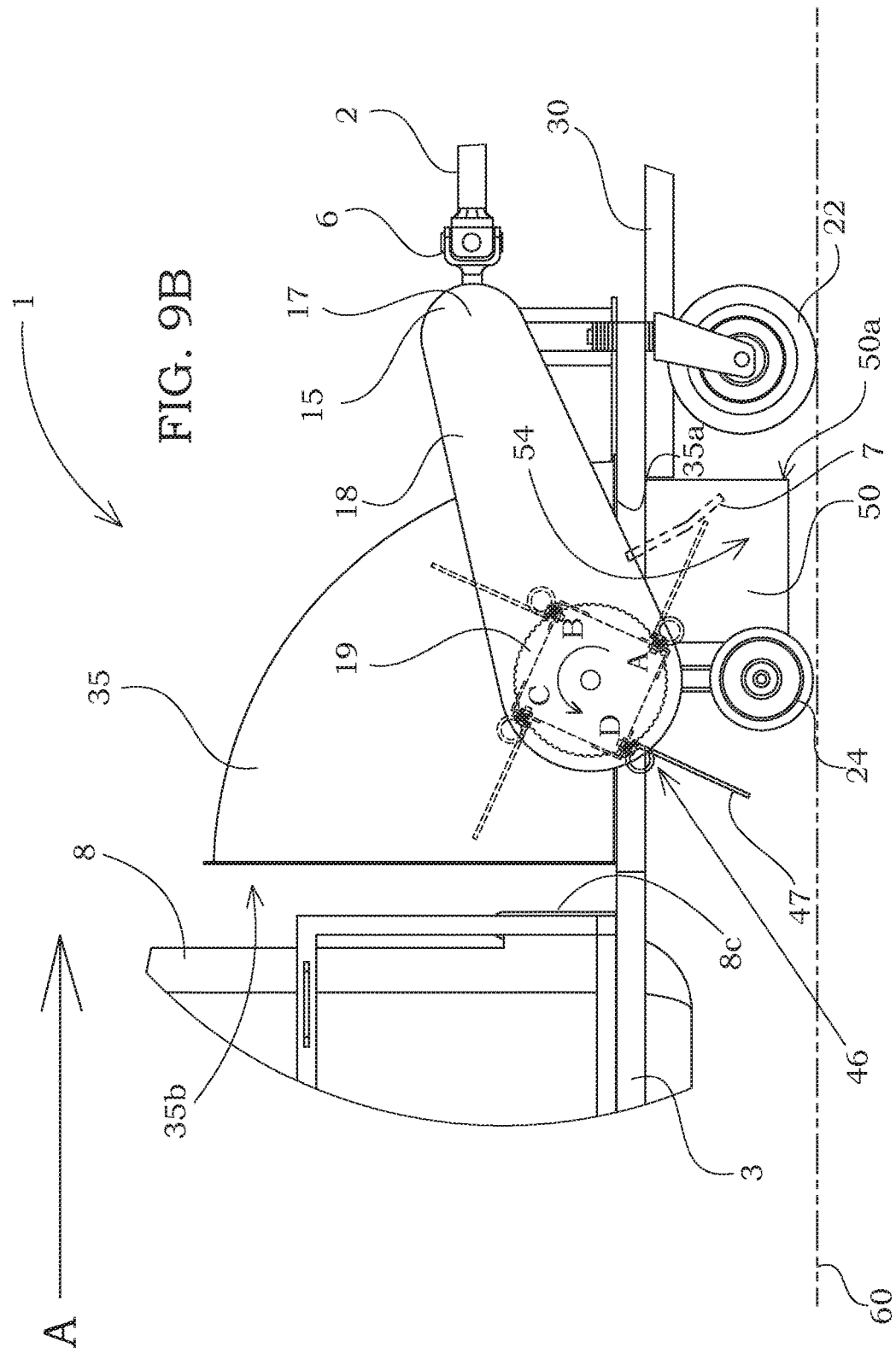
Figure 9C:
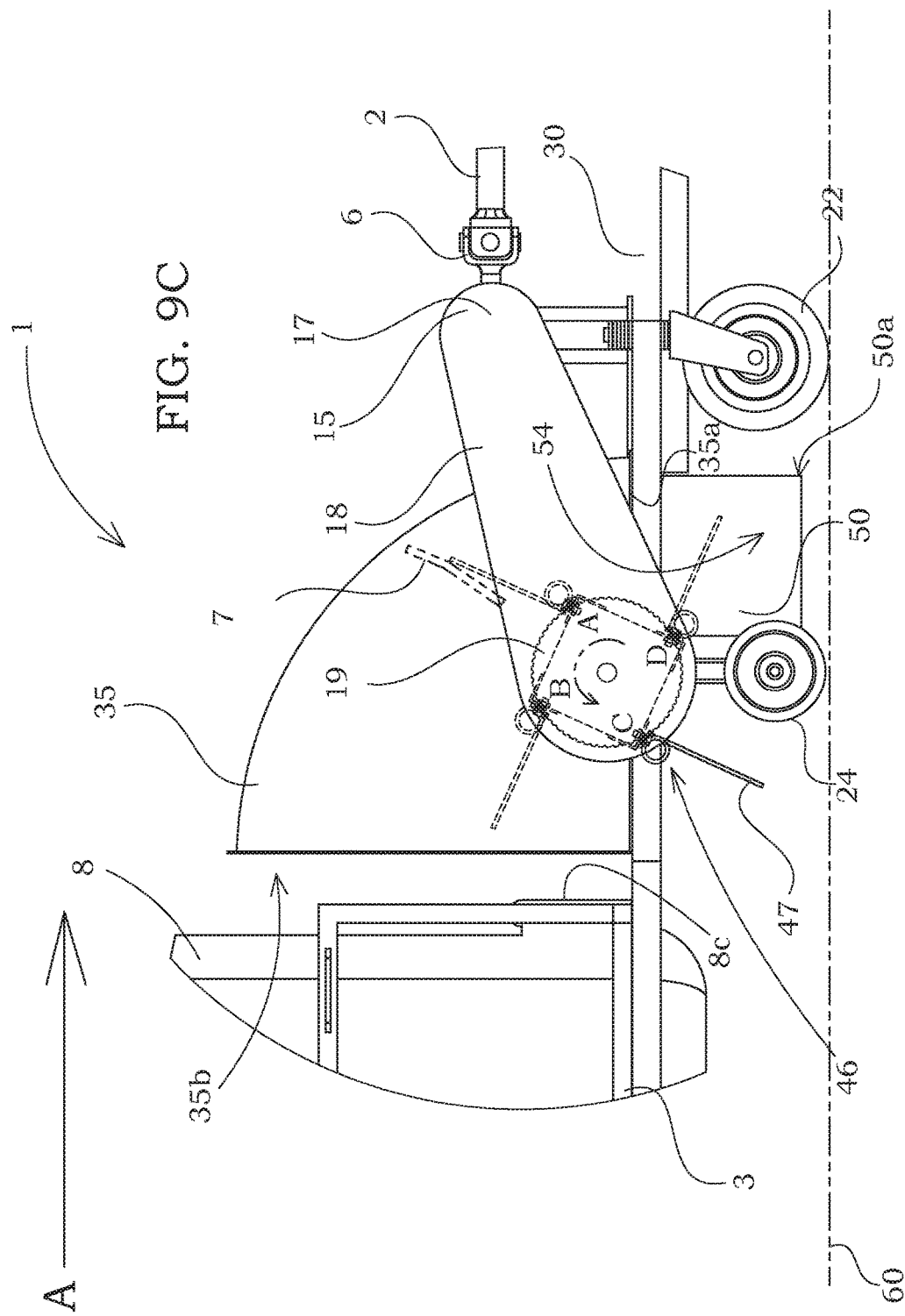

As shown in FIGS. 1, 2, 3 and 9A-9D, the housing 35, which the picked-up debris are lodged or thrown against (as illustrated in FIGS. 9B-9C) after engagement with tines 47 for propelled delivery to basket 8 is made from an outer rigid frame comprising (1") square tubing surrounding a sheet metal body that encloses the anterior portion of the rake attachment 40 and has a curvilinear shape which generally emulates the curvature of rake drum. The housing 35 is forty-three inches (43") wide with a brace beam centered horizontally along the housing 35 for support. The housing 35 has intake side or portion 35a which is open to and faces the ground or terrain upon which the debris collector 1 operates. The housing 35 has a discharge side or portion 35b which is open to the basket 8. The housing intake and discharge (35a, 35b) are about 90 degrees apart. During operation, the debris 7 is engaged (picked up) and carried vertically through the housing 35 for horizontal expulsion and deposit in the basket 8 with the shortened front wall of the basket 8c and the centrifugal force of the debris 7 engaged working to collect the debris 7 in the basket 8.

The basket 8 to catch debris 7 may be constructed of hard plastic and as illustrated measures thirty one inches by forty-six inches (31½"×46") and is attached to the frame 3 by a five-eight inch (⅝") pin. (See FIGS. 2-7) A one-inch (1") frame 9 runs around the entire perimeter of the basket 8. This basket frame 10 is six inches (6") down from the top and acts as both a brace and a hand hold 11 to dump the basket 8. The basket frame 10 is supported on each side with a vertical support 4 measuring one and one half inches by twelve inches tall (1½"×12") set six inches (6") from the back of the frame 3b. As shown in the figures throughout, and with particular detail in FIGS. 2A-2C, the upper portion of the basket frame 10a is attached to the lower portion 10b to surround and secure the basket 8 using a combination of stabilizers 10c and cross members 10d to hold it rigid and provide necessary strength to allow use on uneven or rough terrain. As will be appreciated by one of ordinary skill, other methods of construction, materials and configurations will suffice to support the basket 8 during use and operation may be selected without limiting the breadth of the disclosure.

The rear wheels 28 are pneumatic and attached to the frame 3 by wheel assembly 27 which is an axle made from a three quarter inch (¾") shaft measuring four and one half inches (4½") in length. The rear wheels 28 are ten and one half inches in diameter (10½") mounted on four and one half inch (4½") rims. As shown throughout the figures, the rear wheel assemblies 27 are made using brackets five inches (5") in length with two triangular pieces attached twenty inches (20") below the frame 3b and five inches (5") in from the back of the frame 3b. One of ordinary skill will appreciate other wheel assembly configurations and constructions are possible without departure from the scope of the present disclosure.

Towards the front of the debris collector 1 there is a flexible engagement member 50, shown throughout the figures but best illustrated at FIGS. 9A-9D, which is affixed to the frame 3 and positioned vertically to keep debris 7 from leaving the tine-debris engagement area 54 surrounding the front of the tines 47 during rotation of the rake attachment 40. As shown in FIGS. 9A-9D, the debris collector 1 is moving from left to right in operating direction "A" over terrain 60. The flexible engagement member 50 as shown throughout is positioned behind the front wheel assembly 22 and in front of the gauge wheel assembly 24. Further, the flexible engagement member 50 is positioned and configured to span both the width of the rake attachment 40 and to also encompass a portion of the sides of the rake attachment (40a, 40b) to create a debris engagement area 54 which functions as a housing intake 35a. (See FIGS. 9A-9B) As shown, the flexible engagement member 50c extends around the sides just to the gauge wheels 24. One of ordinary skill in the art will appreciate other dimensions may be suitable, dependent on conditions and the debris to be removed.

During operation of the debris collector 1, the front wheels 22 and gauge wheels 24 function to allow the front portion of the debris collector 1 to closely follow the contour of the terrain 60 upon which the debris collector 1 operates. (See FIGS. 9A-9D) Further, the gauge wheels 24 ensure the impact of elevation changes in the terrain occurring between the front wheel 22 and the rake tine 47 are minimal.

One of ordinary skill in the art will appreciate that the operation of the debris collector 1 can be modified in a multitude of ways including without limitation, the distance between the frame and the terrain (56), the distance between the tines and the terrain (57), and the distance (gap) between the flexible engagement member and the terrain (58). (See FIGS. 9A-9D)

As shown in the above figures, the distance between the frame 3 and the terrain 60 is selected by adjusting the height of the front wheel assembly 21. (See previous discussion and description) Adjusting this dimension changes the depth of the tines 47 engaging the terrain 60, i.e. downward adjustment increases engagement with the terrain 60, which can increase, by way of example and without limitation, removal of grass clippings from the terrain allowing the debris collector 1 to be used for de-thatching. (Not shown) Too much downward adjustment, however, can negatively affect performance as too much soil may be engaged and removed from the terrain. (Not shown) Adjustment of the distance between the frame and the terrain (56) may be accomplished by using the three-point hitch of a tractor (not shown) engaged with the hitch 30 to raise or lower the height of the frame 3, as limited by the position or adjustment of the front wheel assembly 21 and front wheels 22. Further methods of height adjustment of both the engagement gap 58 and the depth of the tines in relation to the terrain 57 are possible and well known to one of ordinary skill, including by application of hydraulic cylinders or pneumatic actuators, with supporting mounting hardware and brackets, in place of the adjustment mechanisms and structures disclosed herein.

Further, by way of illustration and without limitation, the front wheel assembly 22 and the gauge wheel assembly 24 may be configured to work cooperatively together to allow adjustment of the engagement gap 58 between the terrain 60 and lower edge of the flexible engagement member 50a. Reduction in the dimension of gap 58 limits the size of the debris 7 collected as well increasing the tension incurred when the lower edge of the engagement member 50a increases downward contact with debris 7. (See FIG. 9B) Conversely, increasing gap 58 allows the size of the debris collected to increase and/or to decrease the tension incurred when the lower edge of the engagement member 50a contacts debris 7, as suitable to the performance of the debris collector 1 and its specific application. Although not shown, two small pieces of flat stock may be mounted to the back of the flexible engagement member 50 to add rigidity and to minimize interference with the rotating tines 47 during operation.

The flexible engagement member 50 during operation may act upon "irregularly positioned" debris, such as yard waste as may be found lying on a lawn. Typically, the irregularly placed material "bumps" against the flexible engagement member and then rolls under it. Engagement of the irregular positioned debris, prior to rolling under the lower edge 50a typically results in positioning the debris so that it is not parallel with the rotating tines 47, which improves engagement of debris with the tines 47 resulting in more debris 7 "catching" upon the rotating tines 47 for transport through the housing intake 35a to basket 8. (See FIGS. 9A-9D)

It should be noted that the debris collector 1 and various elements thereof are not limited to the specific embodiments pictured and described herein, but is intended to apply to all similar apparatuses and methods for removing debris from terrain. Modifications and alterations from the described embodiments will occur to those skilled in the art without departure from the spirit and scope of the debris collector 1. Furthermore, variations and modifications of the foregoing are within the scope of the debris collector 1. It is understood that the debris collector 1 as disclosed and defined herein extends to all alternative combinations of two or more of the individual features and/or methods mentioned or evident from the text and/or drawings. All of these different combinations constitute various alternative aspects of the debris collector 1. The embodiments described herein explain the best modes known for practicing the debris collector 1 and will enable others skilled in the art to utilize the same. The claims are to be construed to include alternative embodiments to the extent permitted by the prior art.

What is claimed is:
1. A pull-type powered debris collection apparatus comprising:
 a) a horizontal frame having a width and a length further comprising a front portion and a rear portion, wherein the front portion of the horizontal frame engages and supports a rotatable rake attachment mounted across its width therein;
 b) a delivery arrangement comprising an intake portion and a discharge portion, wherein the intake portion is operatively engaged with a flexible engagement member positioned anterior of the rotatable rake attachment and across the width of the rotatable rake attachment, wherein the delivery arrangement is configured and arranged to provide a quantity of collected debris from said intake portion to said discharge portion;
 c) a pair of caster wheels attached to the front portion of the horizontal frame and positioned across its width therein, the pair of caster wheels positioned anterior the rake attachment;
 d) a pair of gauge wheels attached to the front portion of the horizontal frame and positioned across its width therein, the pair of gauge wheels positioned posterior the flexible engagement member;
 e) a basket cooperatively engaged with the rear portion of the horizontal frame, wherein the basket is defined as having a first side, a second side, and a third side, wherein the first side and the second side are substantially perpendicular to each other, wherein the second side and the third side are substantially perpendicular to each other, wherein the rear portion of the frame surrounds the first, second and third sides, wherein the basket is repositionable so that the basket is able to receive the quantity of collected debris from the discharge portion of the delivery arrangement in a first position and discharge the quantity of collected debris from the basket in a second position;
 f) a pair of wheels configured for attachment to the rear portion of the horizontal frame and positioned across its width therein, the pair of wheels positioned posterior the rake attachment;
 g) a hitch having a first and a second end, wherein the first end is connected to the front portion of the horizontal frame and the second end is attachable to a garden tractor allowing the powered debris collection apparatus to be pulled along during operation to collect debris;
 h) a power arrangement for delivering power to rotate the rake attachment during operation to collect debris; and,
 i) the basket being supported by two vertical supports of the frame, the basket being located between the two vertical supports, the basket being rotatable about a pivot axis, the pivot axis intersecting the basket and the two vertical supports, the pivot axis being above a base of the basket when the basket is in the first position, and the pivot axis being below the base of the basket once the basket is pivoted to the second position.

2. The pull-type powered debris collection apparatus according to claim 1 wherein the rake attachment is a rotatable drum having a plurality of rows of tines therein.

3. The pull-type powered debris collection apparatus according to claim 2 wherein the alignment of one of the plurality of rows of tines is offset in relation to another one of the plurality of rows of tines.

4. The pull-type powered debris collection apparatus according to claim 2 wherein the pair of caster wheels allow adjustment of the tines of the rake attachment in relation to the frame.

5. The pull-type powered debris collection apparatus according to claim 1 wherein the discharge portion of the delivery arrangement comprises a housing.

6. The pull-type powered debris collection apparatus according to claim 5 wherein the housing of the discharge portion of the delivery arrangement is angled approximately 90 degrees from the intake portion.

7. The pull-type powered debris collection apparatus according to claim 6 wherein a direction of rotation of the rake attachment delivers the collected debris through the housing to the basket during operation in opposite to a direction the pull-type powered debris collection apparatus is pulled.

8. The pull-type powered debris collection apparatus according to claim 1 wherein the rake attachment is further comprised of a rake drum shaft having a first end and a second end, wherein the rake drum shaft is affixed to the horizontal frame via a carriage bearing positioned at each end of the rake drum shaft, the rake drum shaft having a plurality of rigid rake tines affixed therein with the rake drum shaft positioned interior the rake attachment.

9. The pull-type powered debris collection apparatus according to claim 1 wherein the power arrangement for delivering power to rotate the rake attachment during operation to collect debris is configured as a PTO shaft.

10. The pull-type powered debris collection apparatus according to claim 1 wherein the second end of the hitch is pivotable and configured for attachment to a three-point hitch.

11. The pull-type powered debris collection apparatus according to claim 1 wherein the flexible engagement member is substantially vertically orientated.

12. The pull-type powered debris collection apparatus according to claim 11 wherein the flexible engagement member does not contact a ground surface during operation.

* * * * *